Patented June 6, 1950

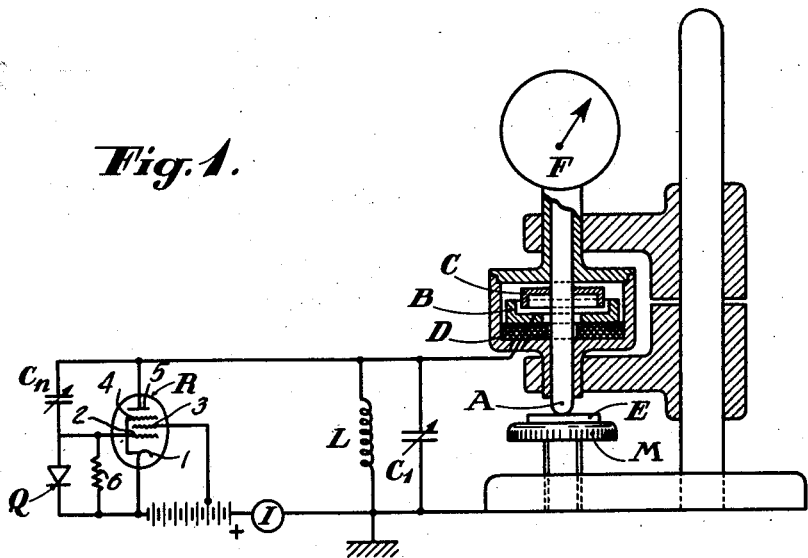
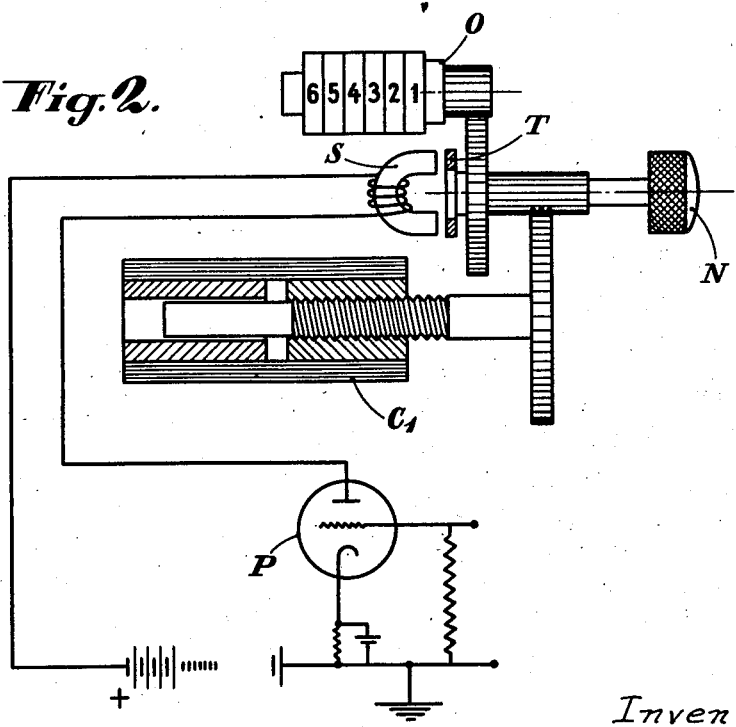

2,510,822

UNITED STATES PATENT OFFICE 2,510,822

APPARATUS FOR ELECTRICALLY MEASURING THICKNESSES

Georges Jacot and Jean Monti, Geneva, Switzerland

Application February 5, 1946, Serial No. 645,589
In Switzerland May 15, 1945

1 Claim. (Cl. 177—351)

The object of the present invention is an apparatus for measuring thicknesses with great accuracy.

The accompanying drawing shows diagrammatically and by way of examples, two forms of this apparatus in Figure 1 and in Figure 2 respectively.

In the drawing, A is the rod of a comparator F reading to one hundredth of a millimetre, mechanically operated in a well known way.

E represents a standard thickness block resting on a support M. The rod A is fixed to the plate C of a linear variation electric measuring condenser, which is capable of being raised or lowered in relation to the other plate B of this condenser; the two plates are tubular. At D is an insulating layer.

The raising or lowering of the plate C effects a variation of the capacity which can be measured with a very great degree of accuracy in making use of an oscillating circuit such as the one indicated on the drawing, which includes a thermionic tube R of the pentode type having a cathode 1, a control grid 2, a screen grid 3, a protection grid 4, which is joined interiorly to the cathode 1, and an anode 5. The quartz crystal Q is connected between the cathode 1 and the grid 2 of the tube R. As shown, the tunable oscillating anode circuit of tube R includes the inductance coil L, a compensating linear variable condenser $C_1$ having tubular plates and provided with means O (Fig. 2) operable with the movable element thereof for indicating variations thereof, and the variable measuring condenser B, C connected across the cathode 1 and the anode 5.

The quartz crystal connected across the cathode 1 and the grid 2 generates oscillations which set up in the anode circuit a high frequency oscillating current depending upon the characteristics of the crystal. It will be noted that grid 3 is connected to a source of positive potential for applying such potential to said grid.

Each variation of capacity of the condenser B, C disturbs the tuning of the oscillating circuit and, in order to restore the electrical balance, the capacity of $C_1$ must be varied, so as to compensate the variation of B, C. Each difference of thickness of E produces a linear variation of the capacity of B, C. The out of tuning is indicated by a milli-ammeter I.

B, C and $C_1$ being absolutely linear, one can gauge $C_1$ directly in fractions of one thousandth of a millimetre, as indicated in Fig. 2.

A condenser $C_n$ is provided in a circuit across the anode 5 and the grid 2 and serves only to neutralize the internal capacity of the tube R in order to obtain a better resonance curve and thus effect the regulation with a smaller variation of the condenser $C_1$ and consequently with greater precision. It is necessary to adjust the condenser $C_n$ only once and then no further adjustment is necessary.

The oscillator thus constituted is placed in a container within which the temperature remains constant.

The comparator F makes it possible to compare the standard block E with the part which is to be measured, by adjusting the engagement depth between themselves of the plates C, B.

Figure 2 embodies a device permitting the direct reading, arranged in such a way that the compensating condenser $C_1$ include a mobile part, the displacements of which are automatically indicated on the reading device.

The unit of a ciphered meter O corresponds to a fraction of one thousandth of a millimetre. The mobile part of the condenser $C_1$ is set in motion either manually by means of a button N or by any other known means. Each fraction of millimetre is automatically indicated by the meter O through a set of gears acting simultaneously on the said meter and on the mobile part of $C_1$.

In order to avoid mistakes due to the personal factor, an electric brake operated by the apparatus itself by means of the electric circuit shown on the diagram, instantaneously stops the mechanism at the moment of going out of tune.

This electric circuit is placed between the ground and the positive high voltage pole of the oscillating circuit. The difference of voltage brought about by the going out of tune of the oscillating circuit controls a tube P which operates on an electro-magnet S acting on a blocking device, as shown on the drawing, in order to cause the stopping of the reading device. On the drawing, the electro-magnet S attracts a flexible disc T which is fixed to the operating shaft.

What we claim as our invention and desire to secure by Letters Patent of the United States is:

An apparatus for measuring thicknesses comprising an oscillating circuit including a thermionic tube having an anode, cathode and plurality of grids interposed between the anode and cathode, an inductance and a first and second variable condenser, connected in parallel across the anode and cathode to form a tunable oscillating circuit, a quartz crystal connected between the cathode and one of said grids, a third variable condenser connected between the anode and the grid which is connected by the crystal to the cathode, means for applying a positive potential to another of said grids spaced from the grids connected by the crystal and third condenser to the cathode and anode, means responsive to the variations in thicknesses to be measured for varying the first condenser, and means operable with the second condenser for indicating the variation thereof.

GEORGES JACOT.
JEAN MONTI.

REFERENCES CITED

The following references are of record in the file of this patent:

UNITED STATES PATENTS

| Number | Name | Date |
|---|---|---|
| 1,431,638 | Dowling | Oct. 10, 1922 |
| 1,835,807 | Parker | Dec. 8, 1931 |
| 1,912,213 | Nicolson | May 30, 1933 |
| 1,992,027 | Green | Feb. 19, 1935 |
| 2,004,361 | Arms et al. | June 11, 1935 |
| 2,008,832 | Leonard | July 23, 1935 |
| 2,081,738 | Conover | May 25, 1937 |
| 2,083,759 | Temple | June 15, 1937 |
| 2,113,210 | Hight | Apr. 5, 1938 |
| 2,146,442 | Price | Feb. 7, 1939 |
| 2,180,175 | Sivertsen | Nov. 14, 1939 |
| 2,240,450 | Wolfskill | Apr. 29, 1941 |
| 2,280,725 | Shepard | Apr. 21, 1942 |
| 2,288,838 | Pike et al. | July 7, 1942 |